H. L. BARRETT.
FEEDING MECHANISM.
APPLICATION FILED AUG. 25, 1919.

1,339,051.

Patented May 4, 1920.
2 SHEETS—SHEET 1.

Inventor
Herbert L. Barrett

By
Herbert E. Smith
Attorney

H. L. BARRETT.
FEEDING MECHANISM.
APPLICATION FILED AUG. 25, 1919.

1,339,051.

Patented May 4, 1920.
2 SHEETS—SHEET 2.

Inventor
Herbert L. Barrett

By Herbert E. Smith
Attorney

UNITED STATES PATENT OFFICE.

HERBERT L. BARRETT, OF OPPORTUNITY, WASHINGTON.

FEEDING MECHANISM.

1,339,051.  Specification of Letters Patent.  Patented May 4, 1920.

Application filed August 25, 1919. Serial No. 319,574.

*To all whom it may concern:*

Be it known that I, HERBERT L. BARRETT, a citizen of the United States, residing at Opportunity, in Spokane county and State of Washington, have invented certain new and useful Improvements in Feeding Mechanisms, of which the following is a specification.

The present invention relates to improvements in feed mechanism for sawing machines and particularly to push feed mechanism for gang saws of the type utilized in the production of match blocks that are sawed from planks by the gang saw.

In this class of work it is essential that the plank or work be presented to the saws at a certain angle in order that the wood may be cut at the proper angle to the grain. It is customary to employ ten saws in the gang and as the plank is of such length as to require two feeds of the length of plank in cutting twenty blocks, the subject matter of the present invention is designed to provide means that may be arranged mechanically and with facility to present the plank to the saws at the proper angle predetermined by the operator or attendant, and the feeding device includes a multiplicity of series of members, one unit for each saw for pushing the sawed blocks. The units of the pusher feed are coupled in series in order that, after they are alined and adjusted parallel with the plank to be sawed, they may be fixed in this adjusted relation by one movement and thus be in position to feed the plank with a feed device between each adjacent pair of saws of the gang and an additional feed unit at the outer sides or ends of the gang of saws.

In the accompanying drawings I have illustrated one complete example of the physical embodiment of my invention, the parts being combined and arranged according to the best mode I have so far devised for the practical application of the principles of my invention.

Figure 1:
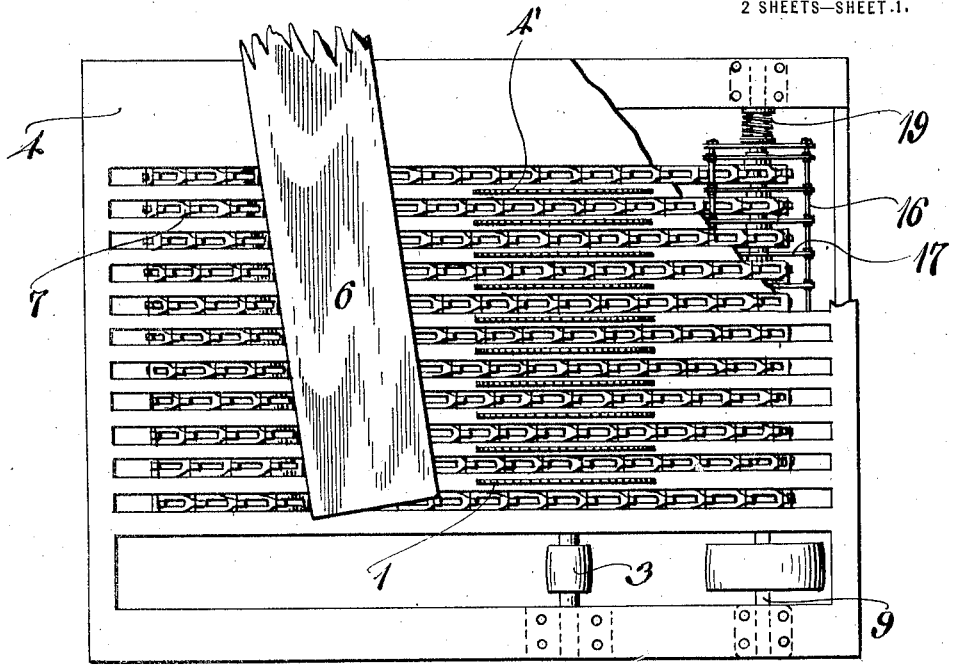
Figure 1 is a top plan view of a saw machine embodying the novel combinations and arrangements of the present invention, part being broken away for convenience of illustration.

In actual practice it has been found desirable to limit the maximum number of saws 1 (of the rotary type) to ten, and these are carried on the saw arbor 2 as usual which is revolved from the driving pulley 3 thereon, and the arbor is journaled in suitable manner beneath the slotted table top or bench 4 supported on the legs 5. The rotary saws are actuated in suitable manner and they project above the table top through the parallel slots 4' in the table top and the plank 6 is fed to the saws at the correct angle, determined by the sawyer, to produce the proper cut in the grain of the wood from which the match blocks are formed, the plank passing from left to right in Fig. 1 of the drawings.

Figure 2:
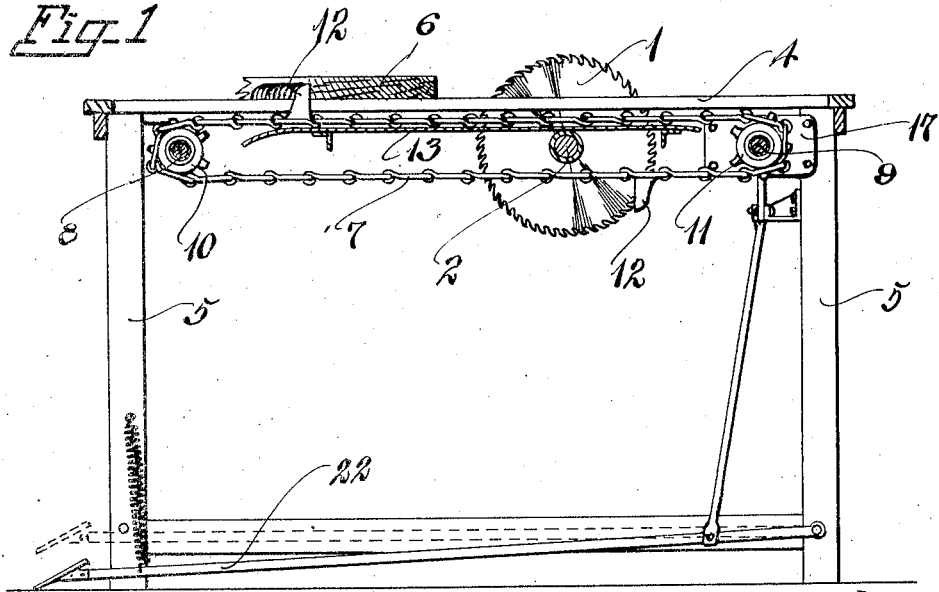
Fig. 2 is a vertical, longitudinal, sectional view of the table or bench and sawing mechanism, showing one of the feed units of the pusher feed device for the plank.

For the ten saws there are eleven feeding units each unit including an endless chain 7 of proper construction and supported between the front and rear shafts 8 and 9 on the pair of sprocket wheels 10 and 11. Both pairs of sprockets are loose on their shafts, the sprockets 10 being idlers and the sprockets 11 being driving wheels for the chains which pass over them, and each chain carries a similar number of equidistant pusher fingers 12, two being in the drawings (Fig. 2). The chains in their slots pass alongside the saws of the gang and between the saws, and the portion of the plank that is to be fashioned as a block has a pusher finger behind it which pushes first the plank and then the cut blocks through the saws and thence off the table after the saws have made their cuts. The chains are guided on horizontal plates 13 beneath the slot in the table and the upper flight of the chain is thus guided and retained in position so that the push finger behind the plank remains in contact or engagement therewith throughout the passage of the plank across the table or bench.

Before the plank is passed to the saws, the series of fingers are alined, usually at an angle to the rectangular lines of the table top, and parallel with the plank to be sawed, and after the fingers have all been adjusted and alined the chains are fixed in adjusted position to revolve or move in unison, thus the fingers all take part in pushing the plank and blocks through the saws. As before stated, the two sets of supporting pulleys or sprockets for the sprocket chains, are loose on the shaft, but the driving sprockets 11 are all capable of being coupled or clutched so that they will be driven by the shaft 9.

Figure 3:
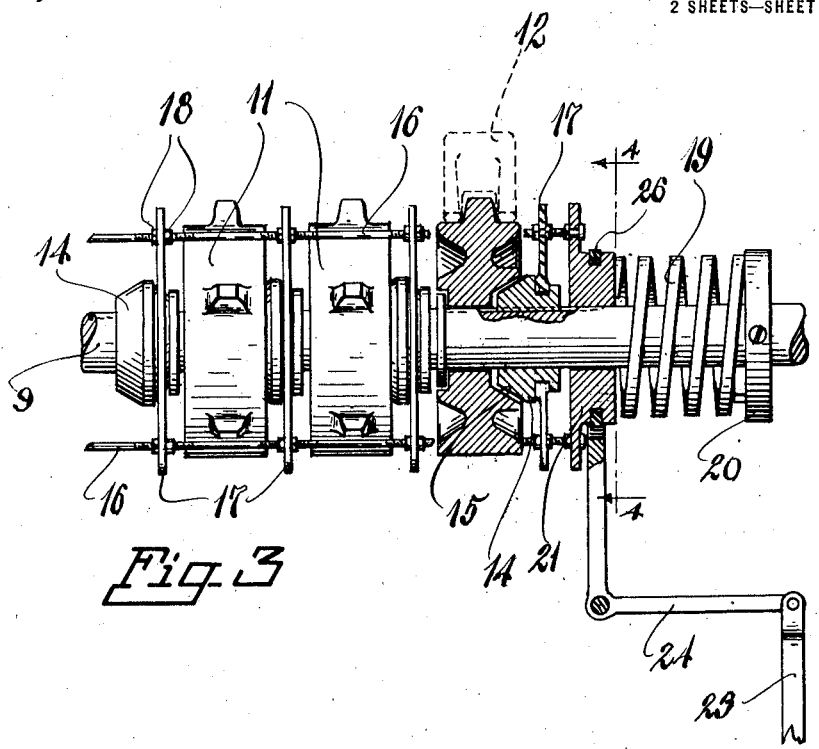
Fig. 3 is an enlarged, detail view showing several of the coupled friction clutches forming part of the feed units, one clutch being shown in section to disclose the interior formation.
Figure 4:
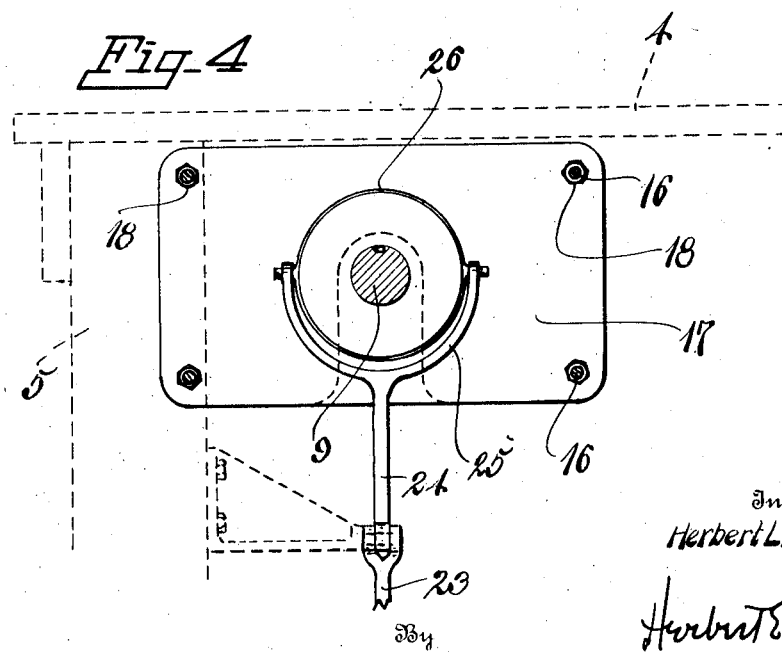
Fig. 4 is an end elevation, showing one of the shafts in section, and with it part of the clutch operating mechanism.

The clutch shaft 9 has a series of friction cones indicated each by the number 14, that are keyed on the shaft and revolve at all times with the shaft, and each of these cones is adapted to frictionally engage the cup or recess 15 in one of the sprockets 11 adjacent to it, thus providing a clutch device for each of the driving sprocket wheels 11. The clutch cones are connected by coupling rods 16, 16, which pass through plates 17, 17 that engage the friction clutch cones as in Fig. 3, and by means of the adjusting nuts 18 these plates, which take the place of forks, may be adjusted in proper operative position with relation to the cone and sprocket, and it will be apparent that the plates and their cones, through this connection, are moved in unison, to engage the series of clutches and simultaneously drive the series of sprockets and chains. By means of the spring 19 coiled about the shaft 9 and interposed between the fixed washer 20 and the slide block 21 on the shaft, the tendency of the spring is to close the clutches on the shaft. The clutches are held open or inoperative through the action of the foot pedal 22 and the link 23 (Fig. 2) which latter is pivoted to the bell crank lever 24 having the forked end 25 and shift ring 26, and it will be apparent that when the pedal is depressed the cones will all be withdrawn from their seats in the recessed sprockets, the withdrawal being against the tension of the spring 19. When the foot pedal is released the spring is then free to engage all the clutches and the driving sprockets are thus all engaged or coupled with the sprocket or driving shaft 9. While the fingers of the chains are being alined parallel with the plank preparatory to feeding the plank to the saws, the pedal is held depressed and the sprocket chains are all free to be moved, during the adjustment, with facility, for alinement of the fingers against the plank, and then after adjustment is accomplished the pedal is released and the alined fingers feed and guide the plank in usual manner, each finger pushing its block through the saws in usual manner. Two cuts are usually required to saw the plank into twenty blocks, and the second cut may be made with the first adjustment, and without the necessity for readjustment.

What I claim is:—

1. In a pusher feed mechanism, the combination with the series of chains and their pusher fingers, supporting shafts, and pairs of loose sprockets thereon for the chains, of a clutch device for each sprocket on one shaft and means for driving the shaft, said clutch devices coupled to act in unison, means for normally holding the clutches in engagement and means for releasing the clutches as described.

2. In a pusher feed mechanism, the combination with the pair of shafts, pairs of loose sprockets on the shafts and a chain with pusher fingers supported on the pairs of sprockets, of a series of friction members on one shaft each adapted to operatively engage a sprocket and means for revolving this shaft, means for coupling the friction members to move in unison to engage their sprockets, and means for releasing the friction members.

3. The combination with the adjustable chains, of supporting sprockets for each chain, a series of friction clutches for one set of sprockets, means normally holding the clutches in engagement, and means for releasing the clutches, as described.

4. The combination with the gang saws, slotted table, pairs of shafts and sprockets and sprocket chains supported thereon and having pusher fingers, of a set of friction clutch members on one shaft to engage the respective sprockets, a spring urging said clutch members into engagement, and means for releasing the members, for the purpose described.

In testimony whereof I affix my signature.

HERBERT L. BARRETT.